United States Patent [19]
Urbansky et al.

[11] Patent Number: 5,359,605
[45] Date of Patent: Oct. 25, 1994

[54] CIRCUIT ARRANGEMENT FOR ADJUSTING THE BIT RATES OF TWO SIGNALS

[75] Inventors: Ralph Urbansky, Schwaig; Michael Niegel; Miguel Robledo, both of Nurnberg, all of Fed. Rep. of Germany

[73] Assignee: U.S. Philips Corporation, New York, N.Y.

[21] Appl. No.: 167,432

[22] Filed: Dec. 13, 1993

Related U.S. Application Data

[63] Continuation of Ser. No. 935,149, Aug. 24, 1992, abandoned, which is a continuation of Ser. No. 540,996, Jun. 20, 1990, abandoned.

[30] Foreign Application Priority Data

Jun. 22, 1989 [DE] Fed. Rep. of Germany ....... 3920391

[51] Int. Cl.$^5$ .............................................. H04J 3/06
[52] U.S. Cl. .................... 370/102; 370/105.3; 375/118
[58] Field of Search ..... 370/84, 100.1, 102, 370/105.1, 105.3, 108, 112, 375/106, 112

[56] References Cited
U.S. PATENT DOCUMENTS

| | | | |
|---|---|---|---|
| 4,158,107 | 6/1979 | Nicholas | 370/105.1 |
| 4,224,473 | 9/1980 | Kaul et al. | 370/102 |
| 4,596,026 | 6/1986 | Cease et al. | 375/118 |
| 4,649,536 | 3/1987 | Krinock | 370/102 |
| 4,669,080 | 5/1987 | Aveneau et al. | 370/102 |
| 4,674,088 | 1/1987 | Grover | 370/105.3 |
| 4,791,652 | 12/1988 | McEachern et al. | 370/102 |
| 4,811,340 | 3/1989 | McEachern et al. | 370/102 |
| 4,845,711 | 7/1989 | LeFort et al. | 370/102 |
| 4,899,339 | 2/1990 | Shibagki et al. | 370/112 |
| 4,928,275 | 5/1990 | Moore et al. | 370/102 |
| 5,014,271 | 5/1991 | Fujimoto et al. | 370/102 |

FOREIGN PATENT DOCUMENTS

| | | |
|---|---|---|
| 2518051 | 11/1975 | Fed. Rep. of Germany ... H04J 3/00 |
| 3843372 | 7/1989 | Fed. Rep. of Germany ......... H04L 25/38 |

OTHER PUBLICATIONS

CCITT, vol. III—Fasc. III 4, "General Aspects of Digital Transmission Systems: Terminal Equipments" Recommendations G. 707–709, pp. 107–174.

Duttweiler, "Waiting Time Jitter", *The Bell System Technical Journal*, vol. 51, No. 1, Jan. 1972, pp. 165–207.

*Primary Examiner*—Wellington Chin
*Assistant Examiner*—Hassan Kizou
*Attorney, Agent, or Firm*—Anne E. Barschall

[57] ABSTRACT

A circuit for adjusting the bit rates of two signals is necessary for plesiochronous multiplexers, for example, to bring the plesiochronous signals, which are to be combined to one digital signal of the next higher hierarchy, to the same bit rate. For this purpose, the circuit arrangement comprises an elastic store (4) as well as a justification decision circuit (15, 16). In order that a circuit having such features can be used for bit rates of the order of 140 Mbit/s and yet can be arranged largely in CMOS technology, the bit clocks of the first and second signals are reduced at the ratio of 1:n. Furthermore, a serial-to-parallel converter (2) converts bit groups of n serial bits of a first signal into bit groups of n parallel bits, which are written in groups into the elastic store (4) and are also read out in groups. The parallel bit groups read out are applied to a controllable selection matrix (5) having n outputs, which transmits n selected bits of more than one bit group to n outputs. The justification decision circuit (15, 16) controls the reading operation of the elastic store (4) and also the selection matrix (5).

16 Claims, 3 Drawing Sheets

TABLE

| | 1 | 2 | 3 | 4 | 5 | 6 | 7 | 8 | 9 | 10 |
|---|---|---|---|---|---|---|---|---|---|---|
| Z1 | – | a2 | b2 | c2 | d2 | <u>e2</u> | f2 | f2 | g2 | h2 |
| Z2 | – | a3 | b3 | <u>c3</u> | d3 | e3 | f3 | f3 | g3 | h3 |
| Z3 | – | a4 | b4 | <u>c4</u> | d4 | e4 | f4 | f4 | g4 | h4 |
| Z4 | – | a5 | b5 | <u>c5</u> | d5 | e5 | f5 | f5 | g5 | h5 |
| Z5 | – | a6 | b6 | <u>c6</u> | d6 | e6 | f6 | f6 | g6 | h6 |
| Z6 | – | a7 | b7 | <u>c7</u> | d7 | e7 | f7 | f7 | g7 | h7 |
| Z7 | – | <u>a8</u> | b8 | c8 | d8 | e8 | f8 | f8 | g8 | <u>h8</u> |
| Z8 | a1 | b1 | c1 | d1 | e1 | f1 | g1 | <u>g1</u> | h1 | i1 |
| Z9 | a2 | b2 | c2 | d2 | e2 | f2 | g2 | g2 | h2 | i2 |
| Z10 | a3 | b3 | c3 | d3 | e3 | f3 | g3 | g3 | h3 | i3 |
| Z11 | a4 | b4 | c4 | d4 | e4 | f4 | g4 | g4 | h4 | i4 |
| Z12 | a5 | b5 | c5 | d5 | e5 | f5 | g5 | g5 | h5 | i5 |
| Z13 | a6 | b6 | c6 | d6 | e6 | f6 | g6 | g6 | h6 | i6 |
| Z14 | a7 | b7 | c7 | d7 | e7 | f7 | g7 | g7 | h7 | i7 |
| Z15 | a8 | b8 | c8 | d8 | e8 | f8 | g8 | g8 | h8 | i8 |

CIRCUIT ARRANGEMENT FOR ADJUSTING THE BIT RATES OF TWO SIGNALS

This is a continuation of U.S. patent application Ser. No. 07/935,149, filed on Aug. 24, 1992, now abandoned, which is a continuation of U.S. Ser. No. 07/540,996, filed on Jun. 20, 1990, now abandoned.

The invention relates to a circuit arrangement for adjusting the bit rates of two signals which comprises an elastic store.

Circuit arrangements of this type are necessary in data transmission, for example, in plesiochronous multiplexers combining plesiochronous signals. Two binary signals are called plesiochronous if their bit rates are nominally the same, but may in fact deviate from the nominal value within a specific tolerance range. Before plesiochronous signals can be combined by a plesiochronous multiplexer, they all have to be brought to the same bit rate which (in so-called positive justification technology) is slightly higher than the bit rate the individual plesiochronous signals have. This difference in bit rates is cancelled, inter alia, by including so-called justification bits from time to time in the signal having a higher bit rate. The present circuit arrangement carries out this process. A corresponding circuit arrangement can be connected after a plesiochronous demultiplexer to remove the justification bits again and bring the bit rates back to their original value.

A circuit arrangement for adjusting the bit rates of two binary signals which comprises an elastic store is disclosed in, for example, DT 25 18 051 A1. In this arrangement a first address counter is timed with the bit clock of the first signal and a second address counter with the (slightly changed) bit clock of the second signal. The address counters generate write and read addresses for an addressable buffer store. For this purpose, the first signal is written into the buffer store bit by bit and read out again bit by bit. A justification decision circuit, in the prior-art arrangement consisting of a phase comparator and a controller, compares write and read addresses of the counters and decides on the basis of the output signal of the phase comparator whether in the clock for the read counters a clock edge is to be suppressed and instead of the next bit in the buffer store a justification bit is to be transmitted.

If the prior-art circuit arrangement is to be used for bit rates of the order of 140 Mbit/s and over, it is to be arranged in ECL technology. Circuits in ECL technology, however, here is more power dissipation than comparable circuits in CMOS technology. On the other hand, circuits in CMOS technology can be used only for frequencies up to about 80 MHz.

It is an object of the invention to provide a circuit arrangement of the type set out in the opening paragraph, which can be used for bit rates of the order of 140 Mbit/s, but for which only few modules in ECL technology are necessary.

This object is achieved by means of the following characteristic features:
 a) means for reducing the bit clock of the first and second signals at the ratio of 1:n,
 b) a serial-to-parallel converter by means of which bit groups of n serial bits of the first signal are converted into bit groups of n parallel bits and are written in groups into the elastic store and also read out in groups from the elastic store,
 c) the parallel bit groups are applied to a controllable selection matrix having n outputs, which comprises means by which the n selected bits from more than one bit group are transmitted to the n outputs.

A circuit arrangement of this type is specifically intended for a plesiochronous demultiplexer; in this case the expert will suitably insert the selection matrix before the elastic store. A corresponding circuit for a plesiochronous multiplexer has a justification decision circuit, which may be arranged to control reading from the elastic store and the selection matrix. Further advantageous embodiments will be apparent below.

The invention will be further explained with reference to the drawing Figures and exemplary embodiments for a plesiochronous multiplexer and a plesiochronous demultiplexer, in which:

FIG. 3 shows a Table in explanation of the operation of the selection matrix.

Figure 1:
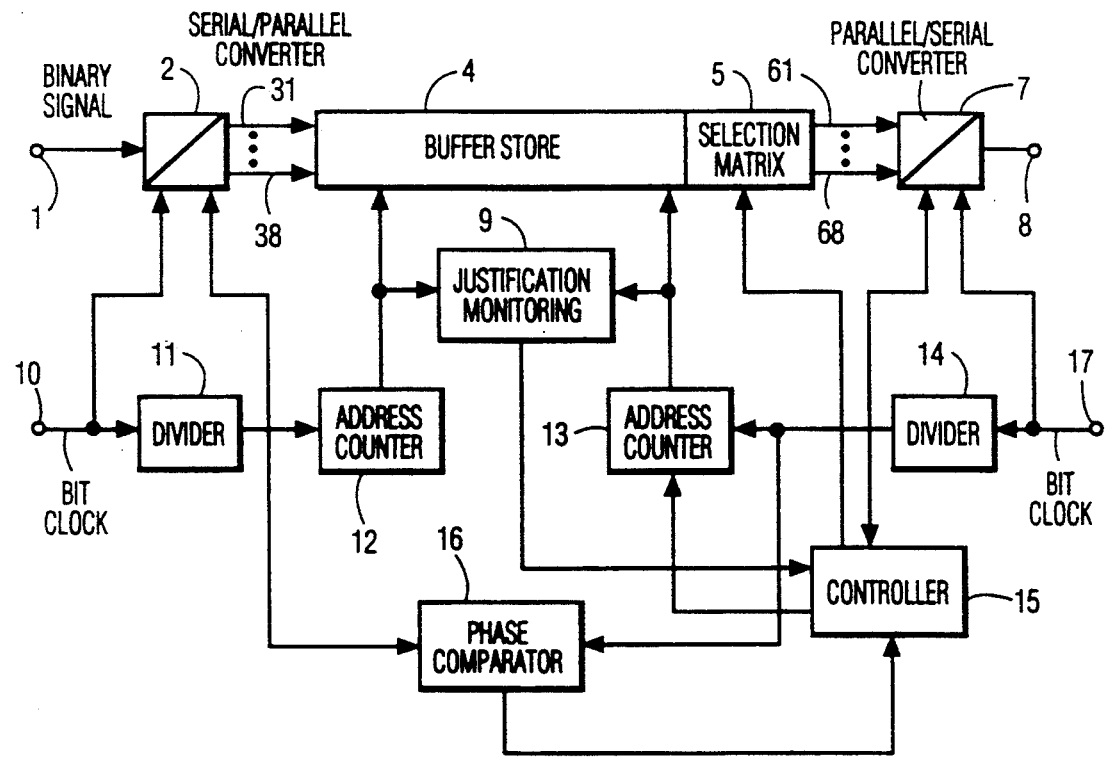
FIG. 1 shows a basic circuit diagram of the arrangement according to the invention for a plesiochronous multiplexer.

In FIG. 1 a first binary signal having a nominal bit rate of 139.264 Mbit/s is available at a terminal 1, and at an output terminal 8 a second binary signal having a nominal bit rate of 155.52 Mbit/s and structured in frames. The second binary signal contains in addition to all bits of the first signal justification bits, justification indication bits and further auxiliary indication bits.

The frame is the so-called synchronous transport module STM-1 (cf. in this respect, for example, the CCITT Draft Recommendations G 707, G 708 and G 709).

The bit clock of the first signal is available at a terminal 10. This clock is reduced by a first divider 11 at the ratio of 1:8. The reduced clock—to be called write clock in the sequel—has a pulse repetition rate of 17.408 MHz. Thus, in the present example the integer variable n can generally be selected to be 8.

A serial-to-parallel converter 2 is supplied with the write clock and the original bit clock and converts eight serial bits of the first signal into eight parallel bits to be transported over lines 31 to 38 to eight read inputs of a buffer store 4. On each of the lines 31 to 38, bits are available at the 17.408 MHz repetition rate. In this way all the modules—apart from the exceptions to be made in the sequel—situated in FIG. 1 to the right of divider 11 and the serial-to-parallel converter 2, can be built in low-loss CMOS technology. A first address counter 12—called "write counter" in the sequel—is incremented by the write clock and cyclically produces write addresses for the eight-bit-wide (one byte) buffer store 4; the write clock is also applied to an input of a phase comparator 16. For the phase comparator 16, however, it is also possible to have a different reduction of the bit clock. The first signal is stored byte-by-byte in buffer store 4 under one of the write addresses produced by the write counter 12.

The bit clock of the second binary signal, which clock is available at a terminal 17, is conveyed to a second divider 14 which divides this clock also at the ratio of 1:8.

This divided clock—called "read clock" in the sequel—and the original bit clock provide the timing of a parallel-to-serial converter 7 which converts the first signal processed in parallel into the serial second signal at a bit rate of 155.52 Mbit/s and transports this second signal to an output terminal 8. All modules, situated in FIG. 1 to the left of divider 14 and the parallel-to-serial converter 7 are arranged—except for the modules 2 and 11—in low-loss CMOS technology because they are to process clock rates of up to a maximum of only 19.44 MHz.

The address counter 13 uses the read clock for cyclically generating read addresses and this clock is also applied to a second input of the phase comparator 16 and a controller 15.

A justification monitoring circuit 9 monitors the distance of write and read addresses and applies a characteristic signal to the controller 15 when this distance differs too much from its nominal value. The nominal value is provided to be half the largest address.

The operation of the circuit arrangement as shown in FIG. 1 would be more understandable if in the frame of the second signal all auxiliary indication bits could be transmitted byte by byte. In the present case, however, it is inconvenient that some auxiliary indication bits (for example, the header) are to be inserted byte by byte whereas the justification bits are to be inserted only bit by bit. In order to be able to insert individual bits or bytes into the second signal, the eight read outputs 41 to 48 (compare FIG. 2) of the buffer store 4 are connected to as many inputs of a selection matrix 5.

Figure 2:
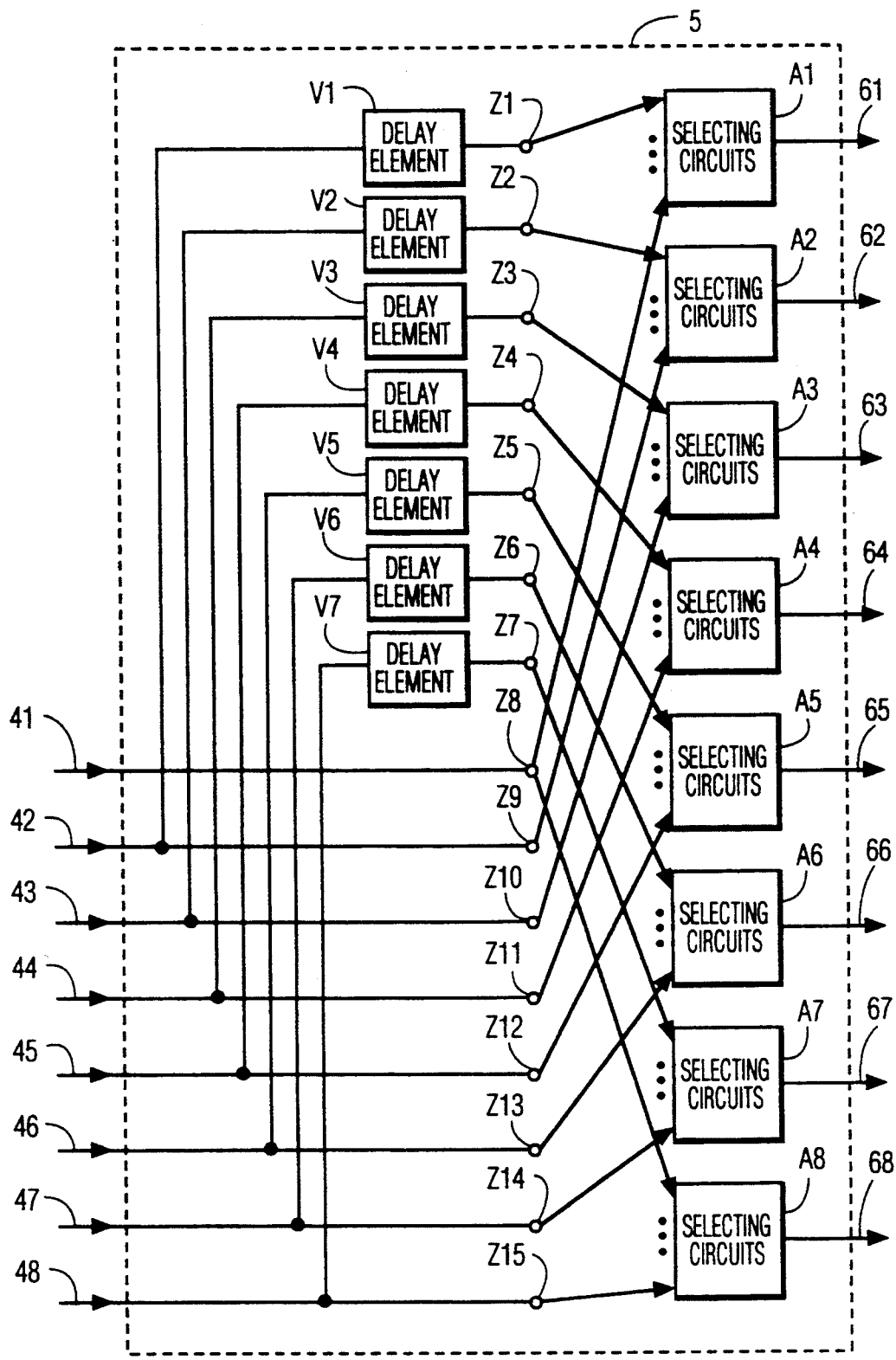
FIG. 2 shows a selection matrix.

FIG. 2 shows an exemplary embodiment of such a selection matrix. It contains seven delay elements V1 to V7 connected to seven of its inputs 42 to 48. The delay elements V1 to V7 delay the bits at the inputs 42 to 48 of the selection matrix 5 by a clock period of the read clock. In this manner there is a maximum of fifteen internal connection points Z1 to Z15 of the selection matrix. The selection matrix further contains eight 8:1-selecting circuits A1 to A8, whose outputs likewise constitute the outputs 61 to 68 of the selection matrix 5. Each of the selecting circuits A1 to A8 has eight inputs of which each one is connected to one of the connection points Z1 to Z15. It particularly holds that the selecting circuit A1 is connected to the connection points Z1 to Z8 (only the first and last connections are shown in FIG. 2), the second selecting circuit to the connection points Z2 to Z9 etc. up to the selecting circuit A8 connected to the connection points Z8 to Z15. The selecting circuits A1 to A8 connect one of the inputs to their output under the influence of their addresses. The control lines for the selecting circuits A1 to A8 and clock supply lines are not shown in FIG. 2.

FIG. 3 is used for explaining the function of the selection matrix as shown in FIG. 2. The Table according to FIG. 3 shows in its left margin the connection points Z1 to Z15. The upper line represents numbers of clock periods of the read clock which are also used as column numbers. The function of the selection matrix 5 will be demonstrated on the basis of 10 clock periods of the read clock. In column 1 the data are represented which are available at the terminals Z1 to Z15 during a first read-clock period; they are the bits a1 to a8 of the byte read first. The bold line indicates that the bits of the first byte from top to bottom, thus in this case in the sequence from a1 to a8, are transmitted to the output lines 61 to 68 of the selection matrix 5 by accordingly adjusting the selecting circuits A1 to A8. In the second clock period the bits b1 to b8 of the second byte are available at the terminals Z8 to Z15—as shown by column 2 of FIG. 3—whereas the bits a2 to a8 of the previous byte are available at the connection points Z1 to Z7. From the bold-line part of column 2 the switch condition of the selecting circuits A1 to A8 can be appreciated. Now the connection points Z7 to Z14 are connected to the lines 61 to 68. It can also be appreciated that from the second byte the bits b1 to b7 are transmitted and the eighth bit a8 of the previous byte is repeated. This repeated bit is transmitted over line 61 and may remain unchanged if its value is irrelevant (e.g. justification bit); alternatively, it is to be overwritten with a very specific value by means of a circuit arrangement (not shown). In the third clock period of the read clock the bits c1 to c8 of a next byte appear at the terminals Z8 to Z15, while the bits b2 to b8 belonging to the previous byte are available at the terminals Z1 to Z7. From the part boxed by a bold line in the third column it may be appreciated that the bit b8 not transmitted in the previous read clock of the second byte is now transmitted to line 61 as the first bit. The underlining of the bit a8 denotes that the information transmitted by it is already known to the receiver and may therefore be overwritten if such an overwriting is necessary. This similarly holds for the fourth column in which from the fourth byte only the bits d1 and d2 are transmitted and the transmission of the lacking bit c8 of the third byte is carried out as yet. All other bits c3 to c7 may be overwritten. If no additional transmission of bits is required, the switch condition of the selecting circuits A1 to A8 and hence the switch condition of the selection matrix remains unchanged as can be recognized in FIG. 3 from the columns 3, 5, 7 and 9.

If the switch condition of the selection matrix is characterised by a track number s (track, because the bits pass through various tracks in different switch conditions according to the selection matrix), it may be concluded from FIG. 3 that the track number s can assume a maximum of eight different integer values. If the number of tracks is selected such that it assumes the value "0" in the switch condition according to column 1 and passes through all integer values until the switch condition according to column 7 has been reached, the track number s also indicates in the modulo-8 mode the quantity of the transmitted justification bits. If the track number exceeds 7, as is the case when changing from column 7 to column 8 in FIG. 3, the read counter and the delay elements V1 to V7 will be retained for one clock period and the seventh byte will be re-read in the example according to FIG. 3 so that no information will be lost. The controller 15 thus adjusts the switch condition of the switching matrix 5 in that it counts in the modulo-8 mode by means of a track counter the bits to be transmitted additionally and in accordance with the count s of this counter generates control addresses for the selecting circuits A1 to A8.

Now the reasons and the criteria will be explained on the basis of which the track number (modulo-8) is enlarged according to the invention. Reductions will not be discussed because in the present case only additional bits are to be transmitted. The bits of the auxiliary information not belonging to the justification bits, will be discarded hereinafter.

The distance criterion of the write and read addresses has preference over all further criteria. If the distance differs from its nominal value, justification bits will be inserted until the nominal distance is attained. In view of the frame structure only one bit per frame line can be justified, so that—usually when the arrangement is started—the justifying procedure is to be carried out for a very long time. In this case the track counter consecutively and cyclically passes through all values from zero to seven. At the transition from seven to zero—cf. Table FIG. 3—the read counter 13 and the delay elements V1 to V7 are stopped for one clock. The stopping of the read counter 13 is also controlled by the controller 15.

A further criterion for increasing the track number is the frequency difference between write and read clocks, i.e. between the bit clock of the first signal and the bit clock of the second signal. The phase comparator 16 and the controller 15 are instrumental in deciding whether justification bits should be used or not on the basis of this frequency difference.

The phase comparator 16 alone compares only the write and read clocks and continuously applies the result of this comparison to the controller 15. If the phase comparator 16 recognizes that justification bits are to be inserted. Thus, if it is a matter of an edge of the read clock deviating fast from the corresponding edge of the slower write clock. The read clock, if a justification bit is really inserted, should be stopped for the duration of one bit (shifted along the time axis). In this way the distance is accordingly reduced and erroneous decisions are not constantly taken because the reduction does not materialize. But stopping the read clock for the duration of one bit (the duration of the second signal) would require fast modules which are specifically to be avoided with this circuit. Consequently, a shift of the read clock does not occur; what equivalent measures are taken instead can be learnt from the embodiments to be discussed in the sequel. However, first an aspect concerning jitter in the recovered first signal on the receive side is to be discussed.

In an STM1 frame justification bits are allowed only at a specific position in the frame line. At the positions preceding in time the positions to be justified, the receiver is informed by means of the above justification indication bits whether the bit located at the position to be justified is a justification bit or an indication bit. Consequently, the decision whether a justification is to be carried out or not (justification decision), is to be made in accordance with the order of magnitude one frame line length before the position to be justified. If the instant of this decision happens to vary with respect to the frame, this will result in additional jitter, the so-called waiting time jitter (cf. in this respect Duttweiler, D. L.: Waiting Time Jitter. Bell System Technical Journal 51 (1972), pp. 165 to 207). Therefore, it is deemed desirable that the decision, whether a justification bit or an indication bit is to be inserted at the position to be justified, always be made at the same distance in time before this position.

In accordance with the invention, however, this additional jitter (waiting time jitter) is avoided because the instant which is a measure for the decision to justify is varied systematically. The following considerations form the basis for this variation:

Since the (unshifted) read clock is synchronized with the STM-1 frame, edges selected in the read clock can be provided which are always sufficiently remote from the position to be justified and are always equally distant in time from these positions. These edges—to be called reference edges in the sequel—are recognized by the control unit 15 (by decrementing an edge number when a line commences). The control unit 15 evaluates the output signal of the phase comparator 16 relative to a reference edge at the occurrence of the $m^{th}$ edge. In other words, at this instant the sign of the phase condition of the write clock relative to the (unshifted) read clock is determined and the decision to justify is made on the basis of this sign.

The integer m searched for results from the requirement that the quantity resulting from evaluating the expression:

$$m*TL/TS-k-s/8$$

as a function of the integers m and k be as small as possible. In this expression TL denotes the period of the read clock, TS the period of the write clock and s the above-mentioned track number. The requirement itself can be derived from an examination of the phase difference between the write clock and a read clock that is shifted by s bits at the instant of a reference edge. The division of the track number s by 8 is connected with the reduction of the bit clocks at the ratio of 1:8. Generally, this 8 can be replaced by n. The range of the permissible values m and k can be selected such that for any s from zero to seven the above expression can be made sufficiently small, because it is a measure for the phase error made by the present arrangement as compared to an arrangement in which the numbers of bits are compared to each other.

If all values k and m are permitted of which the magnitude is smaller than 25, then TL/TS=17.408/19.44=0.8955 and for any s the above expression will be less than 0.1.

The value m (s) determined in this manner is stored in a memory of the control circuit 15 which circuit is also arranged in CMOS technology.

The track number s thus determines the edge of the read clock at which the phase comparator 16 is scanned and the switch position of the selection matrix 5.

Figure 4:
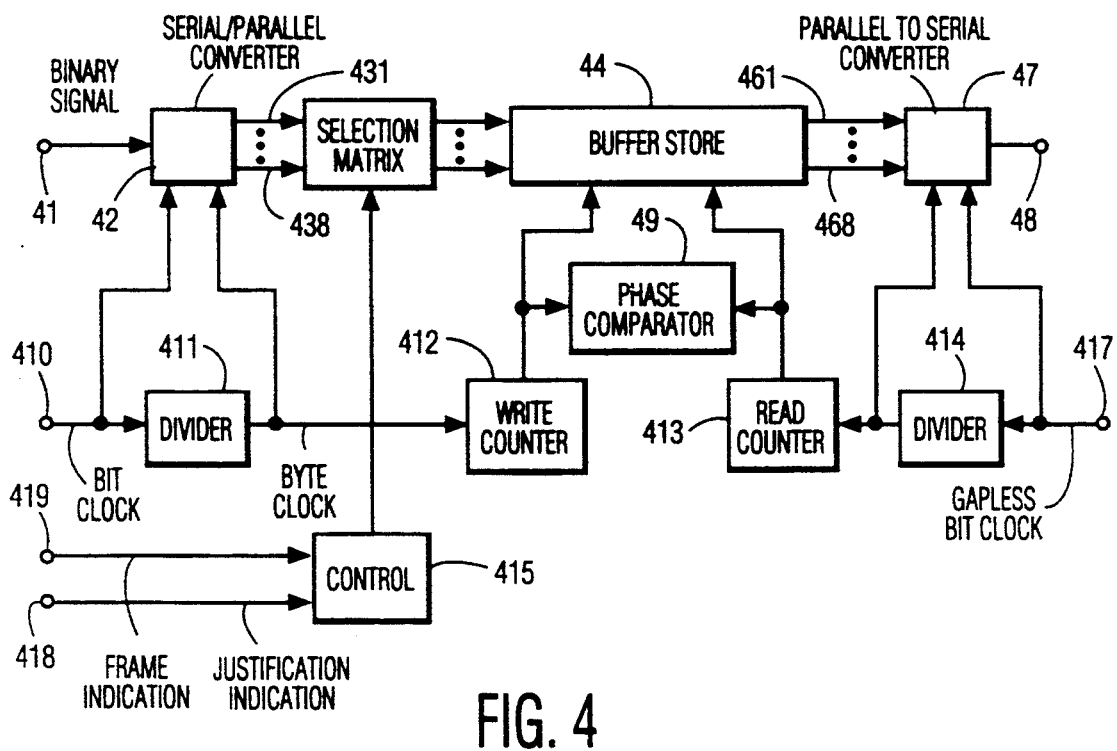
FIG. 4 shows a basic circuit diagram of the arrangement according to the invention for a plesiochronous demultiplexer.

FIG. 4 shows on the receive side of a transmission system an incoming first binary signal available at a terminal 41 which is applied to a serial-to-parallel converter 42. This first binary signal has a nominal bit rate of 155.52 Mbit/s and is one of four STM-1 signals which is produced after the subdivision of a STM-4 signal by a demultiplexer (not shown). The bit clock of the first binary signal which shows clock gaps is applied to the arrangement as shown in FIG. 4 over a terminal 410 and the justification indication bits recovered from the first binary signal over a terminal 418. The justification indication bits and the bit clock showing clock gaps are recovered from the transmitted STM-4 signal by an arrangement (not shown) dedicated to the demultiplexer.

The terminal 418 is connected to a control arrangement 415 which, in essence, consists of a cyclically operating track counter by means of which the switch position of the selection matrix 45 is adjusted. The track counter is timed with the byte clock which results from a division at the ratio of 1:8 of the first binary signal in a divider 411. The gaps in the bit clock at terminal 410 are distributed such that after the clock at the output of counter 411 is decreased, a byte clock having byte clock gaps appears. For the guidance in the actual frame of the first binary signal the necessary indication bits are applied to the control arrangement 415 over a terminal 419. The unit providing these indication bits is also dedicated to the demultiplexer.

The selection matrix 45 is constructed according to the same principle as the selection matrix 5 in FIG. 1, FIG. 2 respectively.

From the serial-to-parallel converter 42 the first binary signal is transmitted byte by byte over lines 431 to 438 to the selection matrix 45. Controlled by a write counter 412, which is clocked by means of the byte clock presenting gaps, the first binary signal is then written into a buffer store 44 byte by byte without justification bytes. A read counter 413 controls the reading from the buffer store 44 which is also performed byte by byte. The read bytes are transmitted over lines 461 to 468 to a parallel-to-serial converter 47 at whose output 48 the second binary signal is available at a nominal bit rate of 139.264 Mbit/s. A phase comparator 49 forms part of a phase control loop (not shown) by means of which the (gapless) bit clock of the second binary signal is recovered. This bit clock is available at a terminal 417. It is divided by means of a divider 414 at the ratio of 1:8. The read counter 413 is supplied with the divided clock and the parallel-to-serial converter 47 with the divided and undivided clock.

FIG. 4 shows—and this also holds for all further Figures—not all clock supply lines. But because the clock supply of digital modules is known to those skilled in the art, such supply lines have been omitted in the Figures for clarity.

What is claimed is:

1. A circuit for adjusting bit rates of input and output signals, which input and output signals comprise bits organized into frames, each frame having a same plurality of frame positions, which frame positions are marked by edges of corresponding input and output bit clock signals, the circuit comprising:
   a) input divider means (11,14)
      responsive to the input bit clock signal for supplying a reduced input bit clock signal at a reduced bit clock rate, which reduced input bit clock rate is reduced at a ratio of 1:n with respect to a bit clock rate of the input bit clock signal, where n is an integer greater than 1, and
      output divider means responsive to the output bit clock signal, for supplying a reduced output bit clock signal at a reduced output bit clock rate;
   b) a serial-to-parallel converter coupled to the input divider means and responsive to the reduced input bit clock signal for converting groups of n serial bits of the input signal into groups of n parallel bits;
   c) an elastic store coupled to the serial-to-parallel converter to receive the groups of n parallel bits at the reduced input bit clock rate and to supply the groups of n parallel bits at the reduced input bit clock rate;
   d) a controllable selection matrix including n parallel inputs, coupled to the elastic store to receive the groups of n parallel bits from the elastic store, and n parallel outputs, the selection matrix including means for selecting bits from among more than one of the groups of n parallel bits; and
   e) a justification decision circuit (9, 15, 16), including
      i) a phase comparator (16) coupled to the input divider means and the output divider means for comparing phases of the reduced input and output bit clock signals; and
      ii) a controller (15) coupled to the phase comparator and responsive to an output signal of the phase comparator and operating at the reduced output bit clock rate, for
         A) evaluating the output signal of the phase comparator at a predetermined frame position, to determine whether insertion of a justification bit is necessary; and
         B) controlling the selection matrix and the supplying operation from the elastic store based on a result of the evaluation so that any necessary justification bit is inserted at a second predetermined frame position,
      so that waiting time jitter is reduced.

2. The circuit of claim 1, wherein the elastic store (4) is an addressable buffer store, and
   further comprising a write counter (12) and a read counter (13) for generating write and read addresses, respectively, for the buffer store, the write and read counters being incremented by edges of the reduced input and output bit clock signals, respectively.

3. Circuit as claimed in claim 2,
   further comprising a justification monitoring circuit (9) for comparing the addresses of the write and read counters (12,13) and, when the difference between them deviates from a nominal value, applying a signal to the controller (15), and
   wherein the controller brings the difference to the nominal value by changing a bit selection of the selection matrix and stopping the read counter.

4. The circuit of claim 1 wherein the selection matrix comprises:
   $n-1$ delay elements, coupled to respective ones of $n-1$ of the n selection matrix inputs, for delaying signals received from the respective ones of the inputs; and
   for selecting a combination of input bits and delayed input bits, n selecting circuits each for selecting a respective bit from among n respective options, each of the n respective options being either a respective delayed bit from one of the delay elements or a respective bit from a respective one of the n inputs, each selecting circuit having a respective output which is a respective one of the n parallel outputs of the selection matrix.

5. The circuit of claim 1, wherein
   a) the selection matrix selects bits according to one of a plurality of predetermined patterns of bits from at least two of the groups of n parallel bits, each pattern being identified by a track number, denoted by a variable, s; and
   b) the controller
      i) stores a current value of the variable, s,
      ii) increments the current value of the variable, s, by unity modulo-n, and thereby specifies selection of a new one of the plurality of predetermined patterns, after insertion of each justification bit, and
      iii) causes re-supply of one of the plurality of groups of n parallel bits from the elastic store when the current value of the variable, s, goes from $n-1$ to zero.

6. The circuit of claim 1, further comprising parallel to serial converter means coupled to the selection matrix and the output divider means for deriving the output signal from the selection matrix under control of the reduced output bit clock signal.

7. The circuit of claim 1 wherein the reduced output bit clock rate is reduced with respect to a bit clock rate of the output bit clock signal by a ratio of 1:n.

8. The circuit of claim 5 wherein the predetermined frame position is the $m^{th}$ frame position relative to a reference frame position, where m is an integer chosen along with a second integer k to minimize a value of the expression $$m*TL/TS - k - s/n$$

where TS and TL denote the cycles of the input and output reduced bit signals, respectively, whereby at the reference frame position the phase shift between the reduced input and output bit clock signals is one bit.

9. The circuit of claim 1 wherein n is greater than two.

10. A circuit for adjusting bit rates on input and output signals, which input and output signals comprise bits organized into frames, each frame having a same plurality of frame positions, which frame positions are marked by edges of corresponding input and output bit clock signals, the input signal including justification bits, the input bit clock including gaps, the circuit comprising:
  a) input divider means (411, 414), responsive to the input bit clock signal at a reduced input bit clock rate, which reduced input bit clock rate is reduced at a ratio of 1:n with respect to a bit clock rate of the input clock signal, where n is an integer greater than 1, and
  b) output divider means responsive to the output bit clock signal, for supplying a reduced output bit clock signal at a reduced output bit clock rate;
  c) an input serial-to-parallel converter (42) coupled to the input divider means for converting groups of n serial bits of the input signal into groups of n parallel bits;
  d) a controllable selection matrix (45) including n parallel inputs, coupled to the input serial-to-parallel converter to receive the groups of n parallel bits from the serial-to-parallel converter, and n parallel outputs, the selection matrix including means for selecting bits from among more than one of the groups of n parallel bits and to remove the justification bits;
  e) an elastic store (44), coupled to the controllable selection matrix to receive groups of n parallel bits from the selection matrix at the reduced input bit clock rate including gaps and without justification bits and to supply the groups of n parallel bits at the reduced output bit clock rate; and
  f) a justification decision circuit (49, 415), including
    i) a phase comparator (49) coupled to the input divider means and the output divider means for comparing phases of the reduced input and output bit clock signals and recovering a gapless output bit clock signal; and
    ii) a controller (415) responsive to framing and justification indication bits and operating at the reduced output bit clock rate, for
    controlling the selection matrix so that any necessary justification bit is deleted so that waiting time jitter is reduced.

11. The circuit of claim 10, further comprising means for deriving the output signal from the elastic store.

12. The circuit of claim 10, wherein the elastic store is an addressable buffer store; and
  further comprising a write counter (412) and a read counter (413) for generating write and read addresses, respectively, for the buffer store, the write and read counters being coupled to the phase comparator and incremented by edges of the reduced input and output bit clock signal, respectively.

13. The circuit of claim 10 wherein the selection matrix comprises:
  n−1 delay elements, coupled to respective ones of n−1 of the n selection matrix inputs, for delaying signals received from the respective ones of the inputs; and
  for selecting a combination of input bits and delayed input bits, n selecting circuits each for selecting a respective bit from among n respective options, each of the n respective options being either a respective delayed bit from one of the delay elements or a respective bit from a respective one of the n inputs, each selecting circuit having a respective output which is a respective one of the n parallel outputs of the selection matrix.

14. The circuit of claim 10, wherein
  a) the selection matrix selects bits according to one of a plurality of predetermined patterns of bits from at least two of the groups of n parallel bits, each pattern being identified by a track number, denoted by an integer variable, s; and
  b) the controller
    i) stores a current value of the variable, s,
    ii) increments the current value of the variable, s, by unity modulo-n, and thereby specified selection of a new one of the plurality of predetermined patterns, after removal of each justification bit.

15. The circuit of claim 10 wherein the reduced output bit clock rate is reduced with respect to a bit clock rate of the output bit clock signal by a ratio of 1: n.

16. The circuit of claim 10, wherein n is greater than 2.

* * * * *